United States Patent
Kim et al.

(10) Patent No.: US 11,637,332 B2
(45) Date of Patent: *Apr. 25, 2023

(54) SENSING SUBSTRATE AND BATTERY MODULE INCLUDING THE SAME

(71) Applicant: SK INNOVATION CO., LTD., Seoul (KR)

(72) Inventors: Yong Uk Kim, Daejeon (KR); Dae Won Kwon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 6 days.

This patent is subject to a terminal disclaimer.

(21) Appl. No.: 17/518,426

(22) Filed: Nov. 3, 2021

(65) Prior Publication Data

US 2022/0059880 A1 Feb. 24, 2022

Related U.S. Application Data

(63) Continuation of application No. 16/394,918, filed on Apr. 25, 2019, now Pat. No. 11,201,362.

(30) Foreign Application Priority Data

Apr. 26, 2018 (KR) ........................ 10-2018-0048420

(51) Int. Cl.
*H01M 10/48* (2006.01)
*H01M 10/42* (2006.01)
*H01M 50/581* (2021.01)
*H01M 50/519* (2021.01)
*H01M 50/569* (2021.01)

(52) U.S. Cl.
CPC ....... *H01M 10/486* (2013.01); *H01M 10/425* (2013.01); *H01M 10/48* (2013.01); *H01M 50/519* (2021.01); *H01M 50/569* (2021.01); *H01M 50/581* (2021.01); *H01M 2010/4271* (2013.01); *H01M 2200/103* (2013.01)

(58) Field of Classification Search
CPC .. H01M 10/425; H01M 10/48; H01M 10/486; H01M 50/519; H01M 50/569; H01M 50/581; H01M 2010/4271; H01M 2200/103; H01M 10/482; Y02E 60/10; G01R 31/396

See application file for complete search history.

(56) References Cited

U.S. PATENT DOCUMENTS

| | | | | |
|---|---|---|---|---|
| 2012/0301747 A1* | 11/2012 | Han | ................. | H01M 10/658 429/7 |
| 2014/0247858 A1* | 9/2014 | Hong | ................. | H01M 10/48 374/142 |
| 2016/0233558 A1* | 8/2016 | Merriman | ............. | H01R 29/00 |
| 2017/0003349 A1* | 1/2017 | Dawley | ............... | H01M 50/209 |

\* cited by examiner

*Primary Examiner* — Muhammad S Siddiquee
(74) *Attorney, Agent, or Firm* — IP & T Group LLP

(57) ABSTRACT

According to the present invention, a dummy terminal is provided on a sensing substrate and the sensing substrate may be thus commonly used on both side surfaces of a battery module, and as a result, since only one type of sensing substrate provided with the dummy terminal needs to be manufactured instead of manufacturing two types of sensing substrates having different arrangements of the substrate terminals, mass productivity of the sensing substrate and the battery module including the same may be significantly improved.

6 Claims, 9 Drawing Sheets

SENSING SUBSTRATE AND BATTERY MODULE INCLUDING THE SAME

CROSS-REFERENCE TO RELATED APPLICATIONS

This application is a continuation of U.S. patent application Ser. No. 16/394,918 filed on Apr. 25, 2019, which claims priority under 35 U.S.C. § 119 to Korean Patent Application No. 10-2018-0048420, filed on Apr. 26, 2018, in the Korean Intellectual Property Office, the disclosure of which is incorporated herein by reference in its entirety.

TECHNICAL FIELD

The following disclosure relates to a sensing substrate capable of improving mass productivity and a battery module including the same.

BACKGROUND

In general, an energy storage system refers to a system that stores power which is excessively generated by a power plant and then supplies the power to meet demand patterns. More specifically, the energy storage system is configured to store the power generated by the power plant in a large energy storage means such as a battery rack without directly supplying the power to a home or a factory, and then supply the power to the home or the factory when the power supply is needed.

The energy storage system is a key technology that is essential for building a Smart Grid that has been emerging recently. Smart Grid refers to an intelligent power grid that optimizes energy efficiency by combining information technology with an existing unidirectional power grid having stages of power generation, transmission, and sales, and exchanging real-time information between power suppliers and consumers in both directions.

The energy storage system includes a battery rack operating system including a plurality of battery racks and a battery management system (BMS), a power conversion system (PCS), and an energy management system. Here, the plurality of battery racks are for charging and storing energy and discharging and outputting the energy when necessary, and the battery management system is for managing the plurality of battery racks.

The battery rack operating system includes a plurality of battery racks connected in parallel to a grid through a relay, wherein each of the plurality of battery racks includes a plurality of battery modules, and each of the battery modules includes a plurality of battery cells and a BMS that manages the plurality of battery cells.

The BMS receives information on a voltage or a temperature of each of the battery cells, and the voltage or the temperature of the battery cell is sensed by an element included in the battery module. However, conventionally, the BMS and a sensing substrate are implemented on a single printed circuit board (PCB), and in this case, most of the heat generated in the BMS is transferred to the sensing substrate, which makes it difficult to accurately sense the temperature.

Meanwhile, the battery module includes a plurality of battery cells including a positive electrode terminal and a negative electrode terminal, respectively, and a plurality of bus bars that electrically connect the positive electrode terminals and the negative electrode terminals of the plurality of battery cells to each other. However, since an arrangement of the bus bars is different on both side surfaces of the battery module, the sensing substrate for sensing the voltage or the temperature of the battery cell also needs to be provided in different forms on both side surfaces of the battery module. However, in this case, there is a problem that mass productivity is inferior because two sensing substrates should be manufactured so that the sensing substrates may be used on both side surfaces of the battery module, respectively.

RELATED ART DOCUMENT

Patent Document (Patent Document 1) Korean Patent Publication No. 0659829 (2016 Dec. 13)

SUMMARY

An embodiment of the present invention is directed to providing a sensing substrate that may be commonly used on both side surfaces of a battery module to improve mass productivity, and a battery module including the same.

An embodiment of the present invention is directed to providing a sensing substrate capable of relatively accurately sensing a temperature of a battery cell, and a battery module including the same.

In one general aspect, a sensing substrate for sensing a voltage or a temperature of a plurality of battery cells, in a battery module including the plurality of battery cells including a positive electrode terminal and a negative electrode terminal, respectively, and a plurality of bus bars that connect the positive electrode terminals and the negative electrode terminals of the plurality of battery cells to each other, includes: a substrate body; and a plurality of substrate terminals protruding from the substrate body and coupled to the positive electrode terminals or the negative electrode terminals of the plurality of battery cells through the bus bars, wherein one or more substrate terminals of the plurality of substrate terminals are coupled to two or more positive electrode terminals of the plurality of battery cells or are coupled to two or more negative electrode terminals of the plurality of battery cells through one of the plurality of bus bars so that the sensing substrate is commonly used on both side surfaces of the battery module.

A temperature sensor may be mounted on the substrate body or at least one of the plurality of substrate terminals, and each of the plurality of substrate terminals may include a substrate terminal body protruding from the substrate body; a cell voltage sensing part provided to an upper portion of the substrate terminal body so as to be coupled to the positive electrode terminal or the negative electrode terminal of each battery cell, and sensing a voltage of each battery cell; and an extending part formed of a material having thermal conductivity, extending to a lower portion of the substrate terminal body from the cell voltage sensing part, and formed on one surface of the substrate terminal body, and the temperature sensor may be mounted on a surface opposite to the surface on which the extending part is formed.

A fuse may be mounted on at least one of the plurality of substrate terminals, and each of the plurality of substrate terminals may include a substrate terminal body protruding from the substrate body; a cell voltage sensing part provided to an upper portion of the substrate terminal body so as to be coupled to the positive electrode terminal or the negative electrode terminal of each battery cell, and sensing a voltage of each battery cell; and an extending part formed of a material having thermal conductivity, extending to a lower portion of the substrate terminal body from the cell voltage sensing part, and formed on one surface of the substrate terminal body, and the fuse may be mounted on a surface opposite to the surface on which the extending part is formed.

The battery module may further include a battery management system (BMS) that manages the plurality of battery cells, and the sensing substrate may further include a wire harness that connects the substrate body with the BMS.

In another general aspect, a battery module may include a plurality of battery cells including a positive electrode terminal and a negative electrode terminal, respectively; a plurality of bus bars that connect the positive electrode terminals and the negative electrode terminals of the plurality of battery cells to each other; and a sensing substrate for sensing a voltage or a temperature of the plurality of battery cells, wherein the sensing substrate includes: a substrate body; and a plurality of substrate terminals protruding from the substrate body and coupled to the positive electrode terminals or the negative electrode terminals of the plurality of battery cells through the bus bars, wherein one or more substrate terminals of the plurality of substrate terminals are coupled to two or more positive electrode terminals of the plurality of battery cells or are coupled to two or more negative electrode terminals of the plurality of battery cells through one of the plurality of bus bars so that the sensing substrate is commonly used on both side surfaces of the battery module.

A temperature sensor may be mounted on the substrate body or at least one of the plurality of substrate terminals, and each of the plurality of substrate terminals may include a substrate terminal body protruding from the substrate body; a cell voltage sensing part provided to an upper portion of the substrate terminal body so as to be coupled to the positive electrode terminal or the negative electrode terminal of each battery cell, and sensing a voltage of each battery cell; and an extending part formed of a material having thermal conductivity, extending to a lower portion of the substrate terminal body from the cell voltage sensing part, and formed on one surface of the substrate terminal body, and the temperature sensor may be mounted on a surface opposite to the surface on which the extending part is formed.

A fuse may be mounted on at least one of the plurality of substrate terminals, and each of the plurality of substrate terminals may include a substrate terminal body protruding from the substrate body; a cell voltage sensing part provided to an upper portion of the substrate terminal body so as to be coupled to the positive electrode terminal or the negative electrode terminal of each battery cell, and sensing a voltage of each battery cell; and an extending part formed of a material having thermal conductivity, extending to a lower portion of the substrate terminal body from the cell voltage sensing part, and formed on one surface of the substrate terminal body, and the fuse may be mounted on a surface opposite to the surface on which the extending part is formed.

The battery module may further include a BMS that manages the plurality of battery cells, and the sensing substrate may further include a wire harness that connects the substrate body with the BMS.

DETAILED DESCRIPTION OF EMBODIMENTS

Hereinafter, a sensing substrate and a battery module including the same according to the present invention will be described in detail with reference to the accompanying drawings. The accompanying drawings are provided by way of example in order to sufficiently transfer the spirit of the present invention to those skilled in the art, and the present invention is not limited to the accompanying drawing provided below, but may be implemented in other forms.

Figure 1:
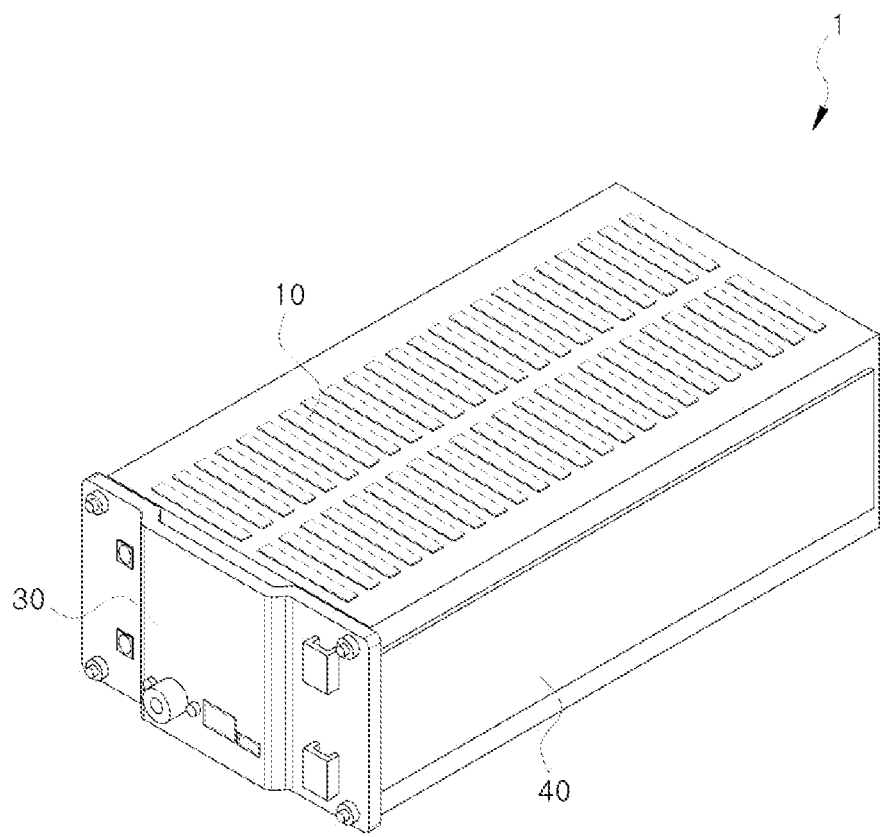
FIG. 1 is a perspective view of a battery module according to an exemplary embodiment of the present invention.
Figure 2:
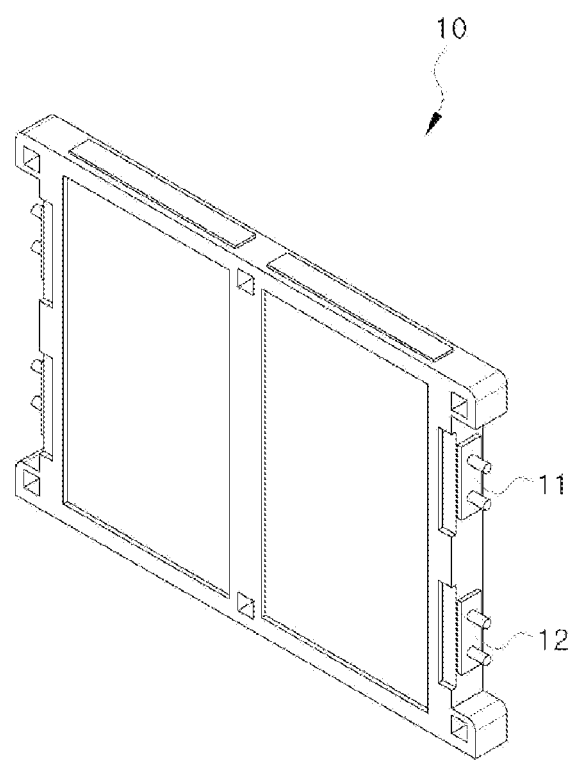
FIG. 2 is a view illustrating a battery cell included in the battery module shown in FIG. 1.
Figure 3A:
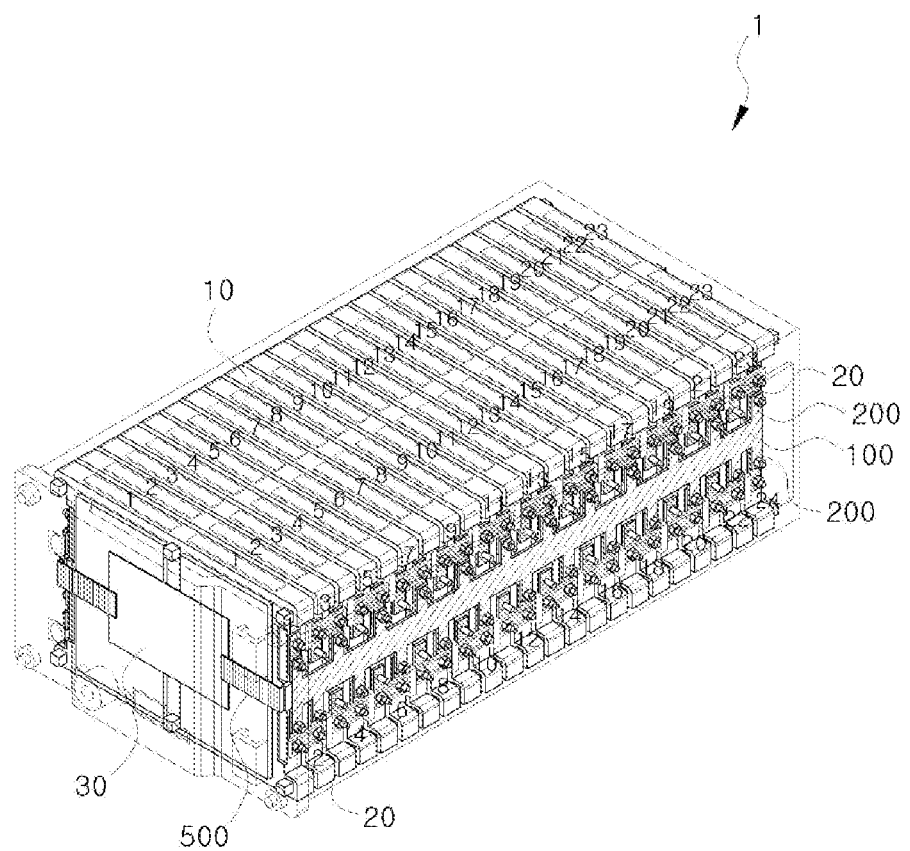
FIG. 3A is a view illustrating an inner appearance of the battery module when the battery module shown in FIG. 1 is viewed from a front right side.
Figure 3B:
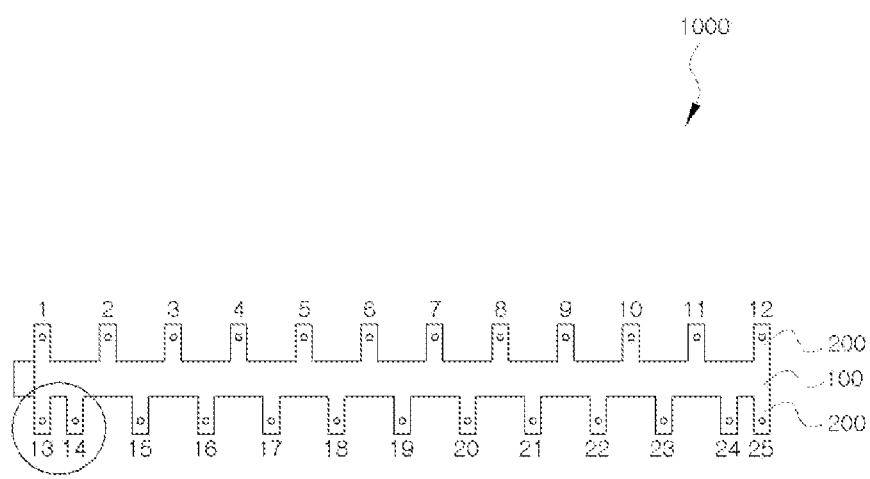
FIG. 3B is a view illustrating a sensing substrate shown in FIG. 3A.

FIG. 1 is a perspective view of a battery module according to an exemplary embodiment of the present invention and FIG. 2 is a view illustrating a battery cell included in the battery module shown in FIG. 1. FIG. 3A is a view illustrating an inner appearance of the battery module when the battery module shown in FIG. 1 is viewed from a front right side and FIG. 3B is a view illustrating a sensing substrate shown in FIG. 3A. In addition, FIG. 4A is a view illustrating an inner appearance of the battery module when the battery module shown in FIG. 1 is viewed from a rear right side and FIG. 4B is a view illustrating a sensing substrate shown in FIG. 4A.

Figure 4A:
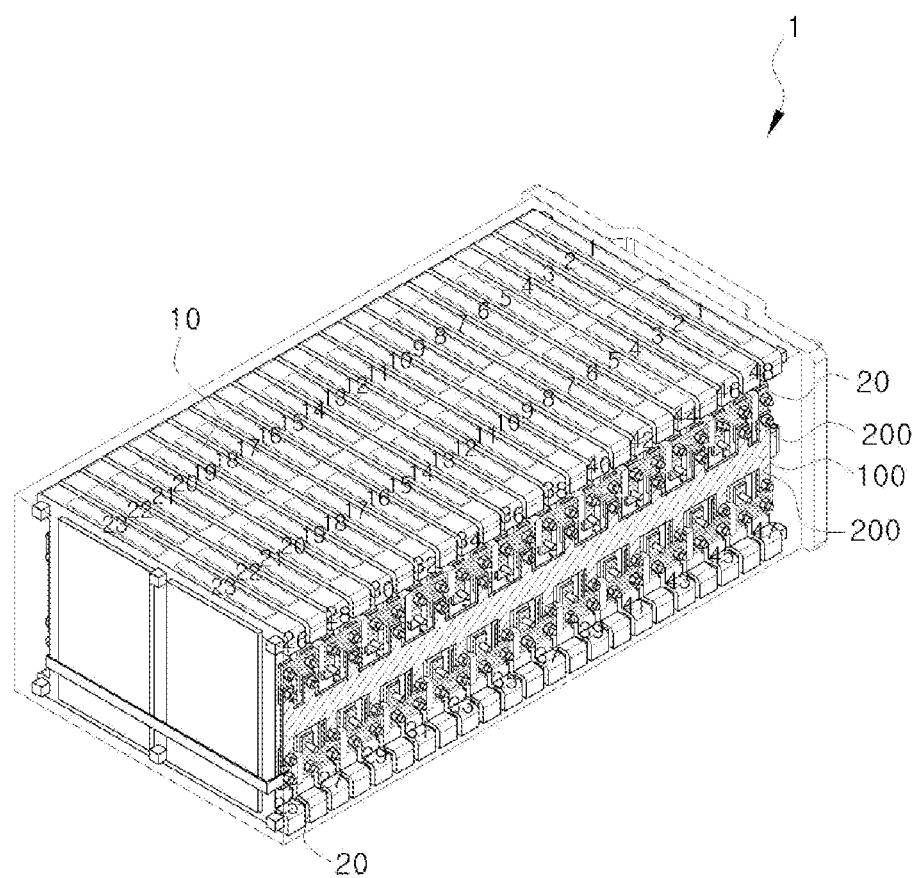
FIG. 4A is a view illustrating an inner appearance of the battery module when the battery module shown in FIG. 1 is viewed from a rear right side.
Figure 4B:
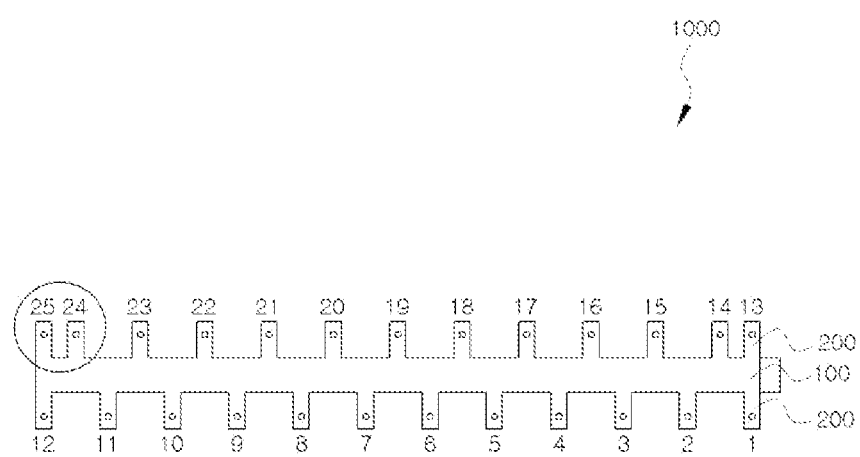
FIG. 4B is a view illustrating a sensing substrate shown in FIG. 4A.

A sensing substrate 1000 according to an exemplary embodiment of the present invention is provided on both sides of a battery module 1 as shown in FIGS. 3A and 4A. In addition, the battery module 1 according to an exemplary embodiment of the present invention may include a plurality of battery cells 10, a plurality of bus bars 20, a BMS 30, a housing 40, and the sensing substrate 1000.

The plurality of battery cells 10 are disposed in a housing 40 along a length direction of the housing 40, and although FIG. 1 shows that a total of 23 battery cells 10 are disposed, the number of battery cells 10 may vary.

As illustrated in FIG. 2, each of the plurality of battery cells 10 includes a positive electrode terminal 11 and a negative electrode terminal 12, and although it is shown that the positive electrode terminal 11 is positioned at an upper side of the battery cell 10 and the negative electrode terminal 12 is positioned at a lower side of the battery cell 10, the positive electrode terminal 11 and the negative electrode terminal 12 may be positioned opposite to each other.

The plurality of bus bars 20 electrically connect the positive electrode terminals 11 and the negative electrode terminals 12 of the plurality of battery cells 10 to each other.

First, referring to FIG. 3A, only a first bus bar 20 is connected to the positive electrode terminal 11 of a first battery cell 10, and a second bus bar 20 is commonly connected to the negative electrode terminal 12 of the first battery cell 10 and the negative electrode terminal 12 of a second battery cell 10. In addition, a third bus bar 20 is commonly connected to the positive electrode terminal 11 of the second battery cell 10 and the positive electrode terminal 11 of a third battery cell 10, and a fourth bus bar 20 is commonly connected to the negative electrode terminal 12 of the third battery cell 10 and the negative electrode terminal 12 of a fourth battery cell 10. In addition, a twenty second bus bar 20 is commonly connected to the negative electrode terminal 12 of a twenty first battery cell 10 and the negative electrode terminal 12 of a twenty second battery cell 10, a twenty third bus bar 20 is commonly connected to the positive electrode terminal 11 of the twenty second battery cell 10 and the positive electrode terminal 11 of a twenty third battery cell 10, and only a twenty fourth bus bar 20 is connected to the negative electrode terminal 12 of the twenty third battery cell 10.

Next, referring to FIG. 4A, only a twenty fifth bus bar 20 is connected to the negative electrode terminal 12 of the twenty third battery cell 10, and a twenty sixth bus bar 20 is commonly connected to the positive electrode terminal 11 of the twenty third battery cell 10 and the positive electrode terminal 11 of the twenty second battery cell 10. In addition, a twenty seventh bus bar 20 is commonly connected to the negative electrode terminal 12 of the twenty second battery cell 10 and the negative electrode terminal 12 of a twenty first battery cell 10, and a twenty eighth bus bar 20 is commonly connected to the positive electrode terminal 11 of the twenty first battery cell 10 and the positive electrode terminal 11 of a twenty battery cell 10. In addition, a forty sixth bus bar 20 is commonly connected to the positive electrode terminal 11 of the third battery cell 10 and the positive electrode terminal 11 of the second battery cell 10, a forty seventh bus bar 20 is commonly connected to the negative electrode terminal 12 of the second battery cell 10 and the negative electrode terminal 12 of the first battery cell 10, and only a forty eighth bus bar 20 is connected to the positive electrode terminal 11 of the first battery cell 10.

As such, the plurality of bus bars 20 may connect the positive electrode terminals 11 and the negative electrode terminals 12 of the plurality of battery cells 10 in series with each other, and here, in order to sense a voltage of the battery cell 10, terminals need to be disposed on the bus bar 20 coupled to the positive electrode terminal 11 and the bus bar 20 coupled to the negative electrode terminal 12, respectively.

For example, in the battery module 1 illustrated in FIG. 3A, in order to sense a voltage of the first battery cell 10, the terminals need to be disposed on the first bus bar 20 and the second bus bar 20, respectively, and in order to sense a voltage of the second battery cell 10, the terminals need to be disposed on the second bus bar 20 and the third bus bar 20, respectively. In addition, in order to sense a voltage of the twenty second battery cell 10, the terminals need to be disposed on the twenty second bus bar 20 and the twenty third bus bar 20, respectively, and in order to sense a voltage of the twenty third battery cell 10, the terminals need to be disposed on the twenty third bus bar 20 and the twenty fourth bar 20, respectively.

However, referring to one side surface of the battery module 1 illustrated in FIG. 3A, only the first bus bar 20 is connected to the positive electrode terminal 11 of the first battery cell 10, the second bus bar 20 is commonly connected to the negative electrode terminal 12 of the first battery cell 10 and the negative electrode terminal 12 of the second battery cell 10, the twenty third bus bar 20 is commonly connected to the positive electrode terminal 11 of the twenty second battery cell 10 and the positive electrode terminal 11 of the twenty third battery cell 10, and only the twenty fourth bus bar 20 is connected to the negative electrode terminal 12 of the twenty third battery cell 10.

Meanwhile, referring to the other side surface of the battery module 1 illustrated in FIG. 4A, only the twenty fifth bus bar 20 is connected to the negative electrode terminal 12 of the twenty third battery cell 10, the twenty sixth bus bar 20 is commonly connected to the positive electrode terminal 11 of the twenty third battery cell 10 and the positive electrode terminal 11 of the twenty second battery cell 10, the forty seventh bus bar 20 is commonly connected to the negative electrode terminal 12 of the second battery cell 10 and the negative electrode terminal 12 of the first battery cell 10, and only the forty eighth bus bar 20 is connected to the positive electrode terminal 11 of the first battery cell 10.

That is, as can be seen in FIGS. 3A and 4A, the arrangements of the plurality of bus bars 20 connecting the positive electrode terminals 11 and the negative electrode terminals 12 of the plurality of battery cells 10 are different on one side surface and the other side surface of the battery module 1, and as a result, it is necessary that a sensing substrate used on one side surface of the battery module 1 and a sensing substrate used on the other side surface of the battery module 1 are provided to have different forms. However, in this case, mass productivity of the sensing substrate is decreased, and as a result, in order to improve the mass productivity, it is necessary to introduce a sensing substrate which may be commonly used on both side surfaces of the battery module 1.

The sensing substrate 1000 according to an exemplary embodiment of the present invention includes a substrate body 100 and a plurality of substrate terminals 200 as shown in FIGS. 3A to 4B.

The substrate body 100 has a generally rectangular shape and is disposed between the positive electrode terminal 11 and the negative electrode terminal 12 of the battery cell 10. Here, the substrate body 100 may be a printed circuit board.

The plurality of substrate terminals 200 vertically protrude in an upward direction and a downward direction of the substrate body 100, and are coupled to the positive electrode terminals 11 or the negative electrode terminals 12 of the plurality of battery cells 10 through the plurality of bus bars 20.

However, as described above, since the arrangements of the plurality of bus bars 20 that connect the positive electrode terminals 11 and the negative electrode terminals 12 of the plurality of battery cells 10 to each other on one side surface and the other side surface of the battery module 1 are different, it is necessary to provide the substrate terminals 200 in consideration of this point in order to improve the mass productivity of the sensing substrate 1000.

Specifically, in the sensing substrate 1000 according to an exemplary embodiment of the present invention, one or more substrate terminals of the plurality of substrate terminals are coupled to two or more positive electrode terminals 11 of the plurality of battery cells 10 or are coupled to two or more negative electrode terminals 12 of the plurality of battery cells 10 through one bus bar of the plurality of bus bars 20.

Referring to FIGS. 3A and 3B, each of the first to twelfth and fifteenth to twenty fifth substrate terminals of the plurality of substrate terminals 200 is separately coupled to one bus bar 20, but a thirteenth and a fourteenth substrate terminals are simultaneously coupled to one bus bar 20. That is, the thirteenth and fourteenth substrate terminals are coupled to the negative electrode terminal 12 of the first battery cell 10 and the negative electrode terminal 12 of the second battery cell 10 through the second bus bar.

Referring to FIGS. 3A and 3B, a twenty fourth substrate terminal of the plurality of substrate terminals 200 is coupled to the negative electrode terminal 12 of the twenty first battery cell 10 and the negative electrode terminal 12 of the twenty second battery cell 10, and a twenty fifth substrate terminal is coupled to the negative electrode terminal 12 of the twenty third battery cell 10.

On the contrary, referring to FIGS. 4A and 4B, each of the first to twenty third substrate terminals of the plurality of substrate terminals 200 is separately coupled to one bus bar 20, but the twenty fourth and twenty fifth substrate terminals are simultaneously coupled to one bus bar 20. That is, the twenty fourth and twenty fifth substrate terminals are coupled to the positive electrode terminal 11 of the twenty second battery cell 10 and the positive electrode terminal 11 of the twenty third battery cell 10 through the twenty sixth bus bar.

Referring to FIGS. 4A and 4B, a thirteenth substrate terminal of the plurality of substrate terminals 200 is coupled to the positive electrode terminal 11 of the first battery cell 10 through the forty eighth bus bar, and a fourteenth substrate terminal is coupled to the positive electrode terminal 11 of the second battery cell 10 and the positive electrode terminal 11 of the third battery cell 10 through the forty sixth bus bar.

That is, as illustrated in FIG. 3A, when the sensing substrate 1000 is provided on one side surface of the battery module 1, any one of the thirteenth and fourteenth substrate terminals becomes a dummy terminal because all of the thirteenth and fourteenth substrate terminals are connected to the second bus bar.

In addition, as illustrated in FIG. 4A, when the sensing substrate 1000 is provided on the other side surface of the battery module 1, any one of the twenty fourth and twenty fifth substrate terminals becomes a dummy terminal because all of the twenty fourth and twenty fifth substrate terminals are connected to the twenty sixth bus bar.

As such, the dummy terminal is provided on the sensing substrate and the sensing substrate may be thus commonly used on both side surfaces of the battery module, and as a result, since only one type of sensing substrate provided with the dummy terminal needs to be manufactured instead of manufacturing two types of sensing substrates having different arrangements of the substrate terminals, the mass productivity of the sensing substrate and the battery module including the same may be significantly improved.

Meanwhile, conventionally, since the BMS and the sensing substrate are implemented on a single printed circuit board (PCB), most of the heat generated in the BMS is transferred to the sensing substrate, which makes it difficult to accurately sense the temperature. However, in the case in which the BMS 30 and the sensing substrate 1000 are installed in the battery module 1 to be spatially separated from each other and the temperature sensor 300 is mounted on the substrate body 100 of the sensing substrate 1000 or at least one substrate terminal 200 in the form of a chip, the accuracy of the temperature sensing may be increased.

Figure 5:
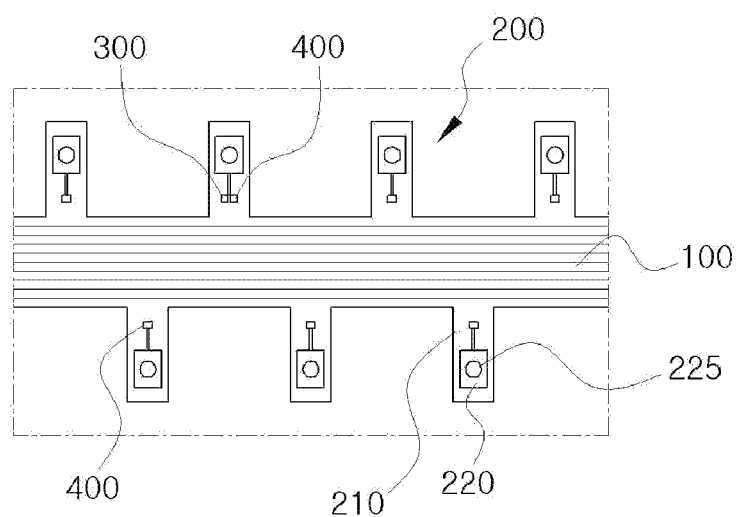
FIG. 5 is a view illustrating an appearance in which a temperature sensor and a fuse are mounted on one surface of the sensing substrate.
Figure 6:
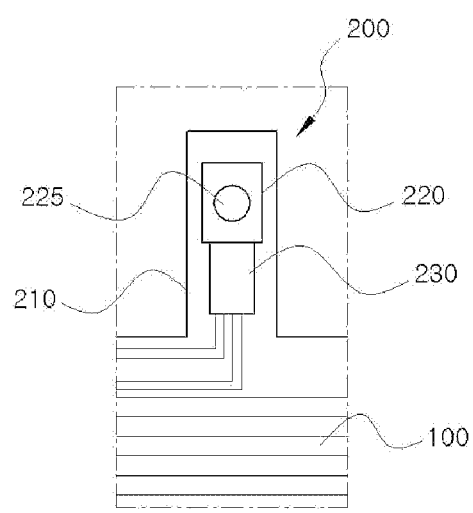
FIG. 6 is an enlarged view of one of a plurality of substrate terminals on the other surface of the sensing substrate.

FIG. 5 is a view illustrating an appearance in which a temperature sensor and a fuse are mounted on one surface of the sensing substrate and FIG. 6 is an enlarged view of one of a plurality of substrate terminals on the other surface of the sensing substrate.

As illustrated in FIGS. 5 and 6, each of the plurality of substrate terminals 200 may include a substrate terminal body 210, a cell voltage sensing part 220, and an extending part 230.

The substrate terminal body 210 may have the form which vertically protrudes in an upward direction and a downward direction of the substrate body 100, and may be the printed circuit board similarly to the substrate body 100.

The cell voltage sensing part 220 is provided onto the substrate terminal body 210 so as to be coupled to the positive electrode terminal 11 or the negative electrode terminal 12 of each battery cell 10, and is formed of a material having electric conductivity to sense a voltage of each battery cell 10.

The positive electrode terminal 11 and the negative electrode terminal 12 of each battery cell 10 may be in the form of a bolt protruding forward as shown in FIG. 2 and a circular hole 225 for receiving the positive electrode terminal 11 or the negative electrode terminal 12 of each battery cell 10 may be provided in the cell voltage sensing part 220.

The positive electrode terminal 11 or the negative electrode terminal 12 of each battery cell 10 may be received in a hole (not shown) provided in the bus bar 20 and the hole 225 provided in the cell voltage sensing part 220 and may be then fastened by a nut to thereby form an assembly including the battery cells 10, the bus bars 20, and the sensing substrate 1000 as illustrated in FIG. 3A or 4A. Here, the assembly of the battery cells 10, the bus bars 20, and the sensing substrate 1000 may be manufactured not only by fastening by bolts and nuts but also by laser welding or ultrasonic welding to each other.

In addition, the cell voltage sensing part 220 is preferably formed of a material having excellent electrical conductivity such as copper for voltage sensing of the battery cell 10 and may be formed on one surface and the other surface of the substrate terminal body 210.

Meanwhile, the extending part 230 is preferably formed of a material having excellent thermal conductivity, and extends toward a lower portion of the substrate terminal body 210 in the cell voltage sensing part 220 and is formed on only one surface of the substrate terminal body 210.

Since the temperature sensor 300 needs to be electrically insulated from the cell voltage sensing part 220, the temperature sensor 300 may not be directly mounted on the cell voltage sensing part 220. However, in the case in which the temperature sensor 300 is mounted on a surface opposite to the surface on which the extending part 230 is formed with the substrate terminal body 210 interposed therebetween, electrical insulation may be ensured by the substrate terminal body 210 and the temperature of the battery cell 10 may be relatively accurately sensed by the temperature sensor 300 due to the extending part 230 formed of a thermally conductive material.

The fuse 400 may be mounted on one of the plurality of substrate terminals 200. Here, the fuse 400 is also preferably mounted on the surface opposite to the surface on which the extending part 230 is formed with the substrate terminal body 210 interposed therebetween similarly to the temperature sensor 300, and this is because electrical insulation may be ensured by the substrate terminal body 210 and a power disconnection function of the fuse 400 may be further improved due to the extending part 230 formed of a thermally conductive material.

Figure 7:
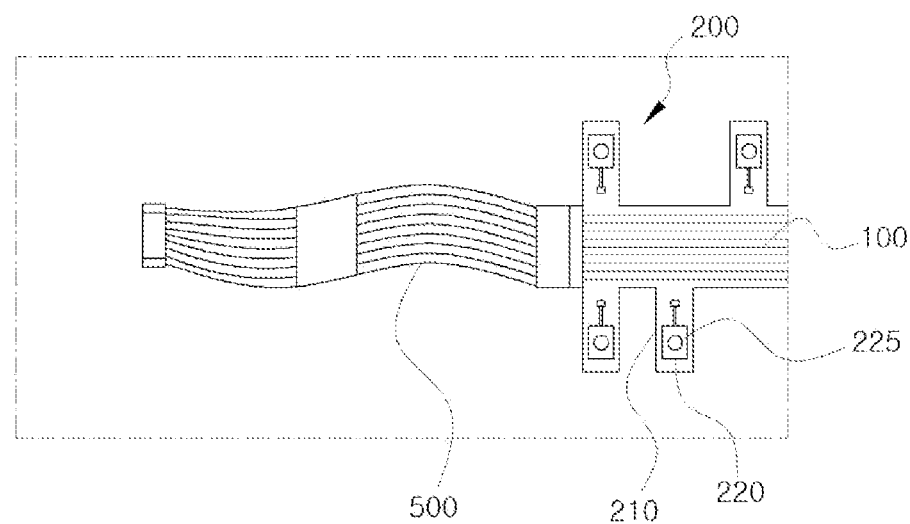
FIG. 7 is a view illustrating an appearance in which a wire harness is provided to one side of a substrate body.

FIG. 7 is a view illustrating an appearance in which a wire harness is provided to one side of a substrate body.

In the BMS 30, the balancing of the cell voltage is performed or a large amount of heat is generated due to an operation of a micro controller unit (MCU), and in this case, when the generated heat is transferred to the substrate body 100 and the substrate terminal 200, it is difficult to accurately sense the temperature of the battery cell 10 and the fuse 400 also becomes difficult to properly exhibit a function thereof.

Accordingly, it is preferable to minimize the phenomenon in which the heat generated in the BMS 30 is transferred to the substrate body 100 and the substrate terminal 200 by providing a wire harness 500 that connects the substrate body 100 with the BMS 30 to one side of the substrate body 100.

The wire harness 500 may be implemented as a cable or a flexible printed circuit board (PCB). In addition, the wire harness 500 may be provided as many as the number of the substrate terminals 200, and the voltage or the temperature of the battery cell 10 sensed by the substrate terminal 200 may be transferred to the BMS 30 through the wire harness 500.

As such, by providing the wire harness 500 that connects the substrate body 100 with the BMS 30, the phenomenon in which the heat generated in the BMS 30 is transferred to the substrate body 100 and the substrate terminal 200 may be minimized, and as a result, the accuracy of the temperature sensing through the temperature sensor may be further increased.

According to the present invention, the dummy terminal is provided on the sensing substrate and the sensing substrate may be thus commonly used on both side surfaces of the battery module, and as a result, since only one type of sensing substrate provided with the dummy terminal needs to be manufactured instead of manufacturing two types of sensing substrates having different arrangements of the substrate terminals, the mass productivity of the sensing substrate and the battery module including the same may be significantly improved.

In addition, according to the present invention, accuracy of the temperature sensing of the battery cell may be increased by mounting the temperature sensor on the substrate, and the wire harness that connects the substrate body with the BMS may be provided to minimize a phenomenon in which the heat generated in the BMS is transferred to the substrate body and the substrate terminals, thereby further increasing the accuracy of the temperature sensing through the temperature sensor.

In addition, the battery module according to the present invention may be used for an energy storage system, and in this case, due to the improvement in the mass productivity of the battery module and the sensing substrate included therein, and the improvement in the accuracy of the temperature sensing, a cost saving and an increase in energy storage efficiency may be expected in driving the energy storage system.

Although the present invention has been described with reference to the exemplary embodiments and the accompanying drawings, it is not limited to the above-mentioned exemplary embodiments but may be variously modified and changed from the above description by those skilled in the art to which the present invention pertains. Therefore, the spirit of the present invention should be understood only by the claims, and all of the equivalences and equivalent modifications to the claims are intended to fall within the scope and spirit of the present invention.

DETAILED DESCRIPTION OF MAIN ELEMENTS

1: battery module
10: battery cell
11: positive electrode terminal
12: negative electrode terminal
20: bus bar
30: BMS
40: housing
100: substrate body
200: substrate terminal
210: substrate terminal body
220: cell voltage sensing part
225: hole
230: extending part
300: temperature sensor
400: fuse
500: wire harness
1000: sensing substrate

What is claimed is:

1. A sensing substrate for sensing a voltage or a temperature of a plurality of battery cells, in a battery module including the plurality of battery cells including a positive electrode terminal and a negative electrode terminal, respectively, and a plurality of bus bars that connect the positive electrode terminals and the negative electrode terminals of the plurality of battery cells to each other, the sensing substrate comprising:
   a substrate body; and
   a plurality of substrate terminals protruding from the substrate body and coupled to the positive electrode terminals or the negative electrode terminals of the plurality of battery cells through the bus bars,
   wherein a temperature sensor is mounted on at least one of the plurality of substrate terminals,
   wherein each of the plurality of substrate terminals includes:
   a substrate terminal body protruding from the substrate body;
   a cell voltage sensing part provided to an upper portion of the substrate terminal body so as to be coupled to the positive electrode terminal or the negative electrode terminal of each battery cell, and sensing a voltage of each battery cell; and
   an extending part formed of a material having thermal conductivity, extending to a lower portion of the substrate terminal body from the cell voltage sensing part, and formed on one surface of the substrate terminal body, and
   the temperature sensor is mounted on a surface opposite to the surface on which the extending part is formed.

2. The sensing substrate of claim 1, wherein one or more substrate terminals of the plurality of substrate terminals are coupled to two or more positive electrode terminals of the plurality of battery cells or are coupled to two or more negative electrode terminals of the plurality of battery cells through one of the plurality of bus bars so that the sensing substrate is commonly used on both side surfaces of the battery module.

3. The sensing substrate of claim 1, wherein the battery module further includes a battery management system (BMS) that manages the plurality of battery cells, and
   wherein the sensing substrate further includes a wire harness that connects the substrate body with the BMS.

4. A battery module comprising:
   a plurality of battery cells including a positive electrode terminal and a negative electrode terminal, respectively;
   a plurality of bus bars that connect the positive electrode terminals and the negative electrode terminals of the plurality of battery cells to each other; and a sensing substrate for sensing a voltage or a temperature of the plurality of battery cells,
wherein the sensing substrate includes:
a substrate body; and
a plurality of substrate terminals protruding from the substrate body and coupled to the positive electrode terminals or the negative electrode terminals of the plurality of battery cells through the bus bars,
wherein a temperature sensor is mounted on at least one of the plurality of substrate terminals,
wherein each of the plurality of substrate terminals includes:
a substrate terminal body protruding from the substrate body;
a cell voltage sensing part provided to an upper portion of the substrate terminal body so as to be coupled to the positive electrode terminal or the negative electrode terminal of each battery cell, and sensing a voltage of each battery cell; and
an extending part formed of a material having thermal conductivity, extending to a lower portion of the substrate terminal body from the cell voltage sensing part, and formed on one surface of the substrate terminal body, and
the temperature sensor is mounted on a surface opposite to the surface on which the extending part is formed.

5. The battery module of claim 4, wherein one or more substrate terminals of the plurality of substrate terminals are coupled to two or more positive electrode terminals of the plurality of battery cells or are coupled to two or more negative electrode terminals of the plurality of battery cells through one of the plurality of bus bars so that the sensing substrate is commonly used on both side surfaces of the battery module.

6. The battery module of claim 4, further comprising:
a battery management system (BMS) that manages the plurality of battery cells,
wherein the sensing substrate further includes a wire harness that connects the substrate body with the BMS.

* * * * *